(12) United States Patent
Ichimaru

(10) Patent No.: US 7,238,013 B2
(45) Date of Patent: Jul. 3, 2007

(54) GAS CYCLE APPARATUS FOR TIRE VULCANIZER

(75) Inventor: Hironobu Ichimaru, Chikugo (JP)

(73) Assignee: Ichimaru Giken Co., Ltd., Chikugo-shi, Fukuoka (JP)

( * ) Notice: Subject to any disclaimer, the term of this patent is extended or adjusted under 35 U.S.C. 154(b) by 0 days.

(21) Appl. No.: 10/554,466

(22) PCT Filed: Apr. 26, 2004

(86) PCT No.: PCT/JP2004/006039

§ 371 (c)(1),
(2), (4) Date: Mar. 7, 2006

(87) PCT Pub. No.: WO2004/103672

PCT Pub. Date: Dec. 2, 2004

(65) Prior Publication Data

US 2006/0275522 A1     Dec. 7, 2006

(30) Foreign Application Priority Data

Apr. 25, 2003  (JP) .............................. 2003-121435

(51) Int. Cl.
*B29C 35/04* (2006.01)
(52) U.S. Cl. .............................. 425/42; 425/43; 425/52
(58) Field of Classification Search ................ 425/40, 425/42, 43, 52
See application file for complete search history.

(56) References Cited

U.S. PATENT DOCUMENTS

| 4,370,283 A | 1/1983 | Arimatsu et al. |
| 4,406,845 A | 9/1983 | Sakon et al. |
| 5,238,643 A * | 8/1993 | Kobayashi .................. 425/42 |

FOREIGN PATENT DOCUMENTS

| JP | 59-42942   | 3/1984 |
| JP | 62-113520 A | 5/1987 |

* cited by examiner

*Primary Examiner*—James P. Mackey
(74) *Attorney, Agent, or Firm*—Flynn, Thiel, Boutell & Tanis, P.C.

(57) ABSTRACT

Disclosed is a gas cycle apparatus for a tire vulcanizer, configured to increase the circulating flow rate of a heating gas by preventing a gas feeder of the gas cycle apparatus from being subjected to an excessive load caused by a drain, and thereby capable of shortening the tire vulcanizing time by improving the temperature difference eliminating capacity in a bladder, to thereby allow the enhancement of the production capacity of tires. A gas circulating flow path 2 constituted by allowing a forward flow path 2a and a return flow path 2b to communicate with each other, is connected to a bladder 1; a gas supply flow path 3 is connected to the forward flow path; an air-water separation section 5 is provided on the way through the return flow path; the return flow path is connected to an upper space 5a of the air-water separation section; and a gas discharge flow path 4 is connected to a lower space 5b of the air-water separation section.

2 Claims, 2 Drawing Sheets

GAS CYCLE APPARATUS FOR TIRE VULCANIZER

TECHNICAL FIELD

The present invention relates to a gas cycle apparatus for a tire vulcanizer.

BACKGROUND ART

The tire vulcanizer includes an upper mold, a lower mold, and a bladder expanding and contracting under the supply/discharge of a heating gas (steam or the like), and is configured to press the bladder expanded by the supply of the steam, against the inner surface of a raw tire set inside the mold.

In such a situation, in order to eliminate the temperature difference within the bladder, a gas cycle apparatus arranged to circulate the heating gas is used, as set forth in, for example, Japanese Unexamined Patent Application Publication No. 62-33611.

As shown in FIG. 2, this gas cycle apparatus includes a bladder 1 expanding and contracting under the supply/discharge of a heating gas; a gas circulating flow path 2 constituted by allowing a forward flow path 2a connected to a supply port 10 of the bladder 1 and a return flow path 2b connected to a discharge port 11 of the bladder 1, to communicate with each other through a circulation valve 20; a gas feeder 21 (pump) provided in the gas circulating flow path 2; and a gas supply flow path 3 connected to the forward flow path 2a; and a gas discharge flow path 4 connected to the return flow path 2b.

In a state where a gas supply valve 30 and gas discharge valve 40 are opened and the circulation valve 20 is closed, a heating gas is supplied from the gas supply flow path 3 to the inside of the bladder 1 to fill it with the heating gas. Thereafter, the gas supply valve 30 and gas discharge valve 40 are closed and the circulation valve 20 is opened. Under this situation, the heating gas is circulated between the gas circulating flow path 2 and the inside of the bladder 1 by the gas feeder 21.

However, in such a conventional gas cycle apparatus, a drain of the heating gas liquefied by a heat exchange within the bladder 1 undesirably flows in the gas circulating flow path 2.

When the drain of the heating gas flows in the gas circulating flow path 2, an excessive load is applied to the gas feeder 21 of the gas cycle apparatus, so that it becomes difficult to increase the circulation flow rate of the heating gas.

This has caused a problem in that the temperature difference eliminating capacity in the bladder 1 decreases, and the tire vulcanizing time increases, resulting in the reduction in production capacity of tires.

The present invention has been made for solving the above-described conventional problem. For this purpose, an air-water separation section is provided in the gas circulating flow path, and the drain is stored in this air-water separation section, whereby the drain is prevented from flowing in the gas circulating flow path.

This inhibits an excessive load by the drain from being applied to the gas feeder of the gas cycle apparatus, and thereby increases circulating flow rate of the heating gas.

As a result, the temperature difference eliminating capacity in the bladder is improved and the tire vulcanizing time is shortened. Herewith, the present invention aims to provide a gas cycle apparatus for a tire vulcanizer, capable of enhancing the production capacity of tires.

DISCLOSURE OF INVENTION

In order to solve the above-described problem, the present invention provides a gas cycle apparatus for a tire vulcanizer. This apparatus includes a bladder expanding and contracting under the supply/discharge of a heating gas; a gas circulating flow path constituted by allowing a forward flow path connected to the supply port of the bladder and a return flow path connected to a discharge port of the bladder, to communicate with each other through a circulation valve; a gas feeder provided in the gas circulating flow path; a gas supply flow path connected to the forward flow path, and a gas discharge flow path connected to the return flow path; and a gas supply valve provided in the gas supply flow path, and a gas discharge valve provided in the gas discharge flow path. Herein, an air-water separation section is provided on the way through the return flow path in the gas circulating flow path; the return flow path is connected to an upper space of the air-water separation section, and the gas discharge flow path is connected to a lower space of the airwater separation section. After vulcanization molding has been completed, in a state where the circulation valve and the gas discharge valve are opened and the gas supply valve is closed, the gas feeder is operated, and thereby heating gas filling the inside of the bladder and the gas circulating flow path is discharged from the gas discharge flow path, while discharging drain stored in the air-water separation section from the gas discharge flow path.

Also, in the gas cycle apparatus for a tire vulcanizer, set forth in claim 1, the gas cycle apparatus (claim 2) for a tire vulcanizer, according to the present invention is configured so that an auxiliary air-water separation section is provided on the way through the forward flow path in the gas circulating flow path; the forward flow path is connected to an upper space of the auxiliary air-water separation section; and the gas supply flow path is connected to a lower space of the air-water separation section.

BEST MODE FOR CARRYING OUT THE INVENTION

Hereinafter, an embodiment according to the present invention will be described with respect to the drawings. The specific construction of the present invention is not limited by the following embodiment.

Figure 1:
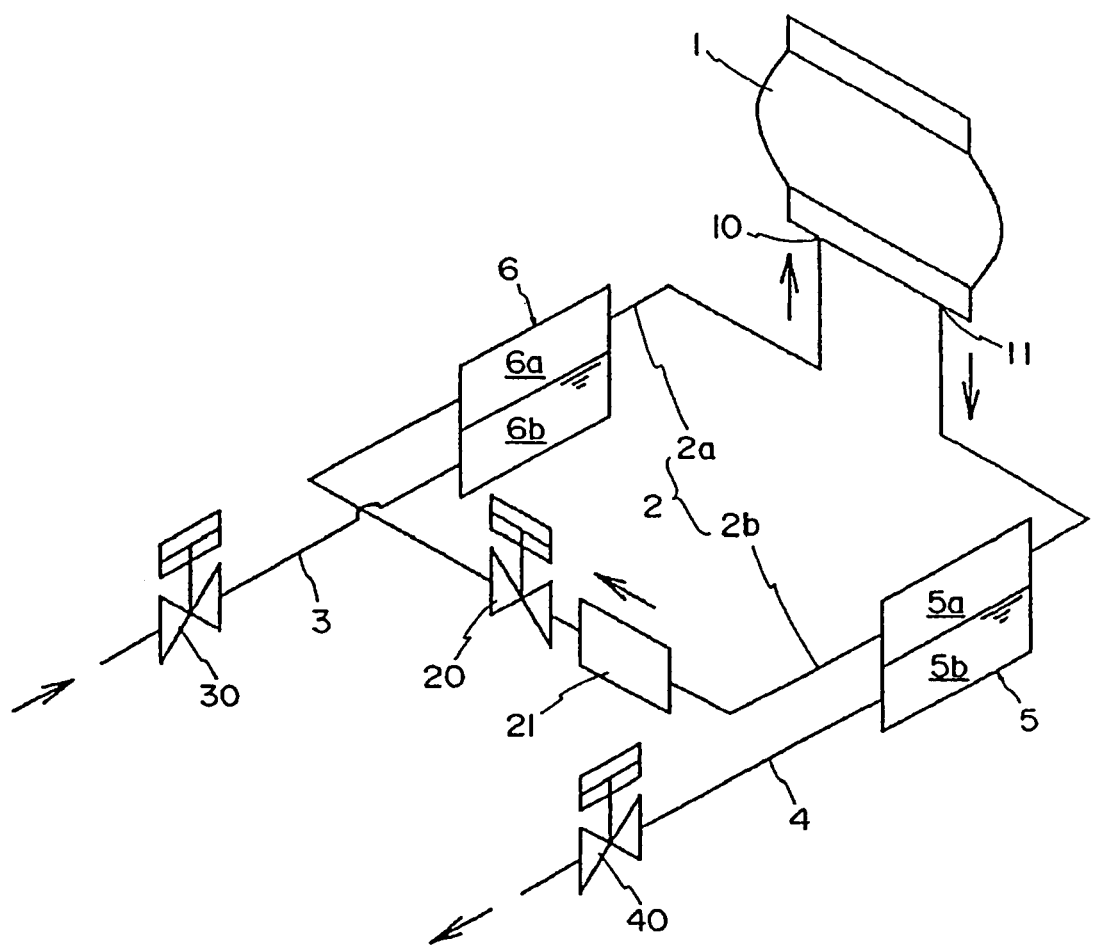
FIG. 1 is a schematic explanatory view of a gas cycle apparatus for a tire vulcanizer, according to the present invention.
Figure 2:
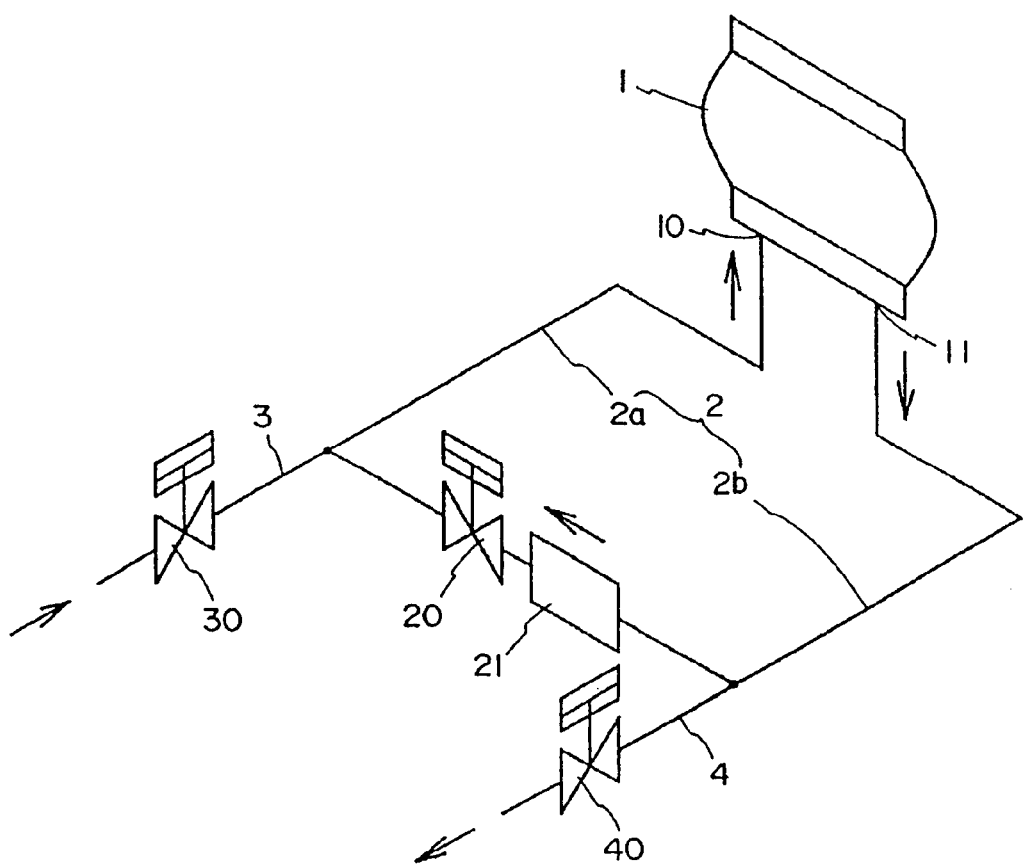
FIG. 2 is a schematic explanatory view of a conventional gas cycle apparatus for a tire vulcanizer.

FIG. 1 is a schematic explanatory view of a gas cycle apparatus for a tire vulcanizer, according to the present invention.

The tire vulcanizer includes upper and lower molds (not shown), and a bladder 1 expanding and contracting under the supply/discharge of a heating gas, and is configured so as to perform vulcanization molding while holding a raw tire, by pressing the bladder 1 expanded by the supply of the heated gas (high-temperature and high-pressure steam, or the like), against the inner surface of the raw tire set inside the mold.

A gas circulating flow path 2 is connected to the bladder 1.

This gas circulating flow path 2 is constituted by allowing a forward flow path 2a connected to a supply port 10 of the bladder 1 and a return flow path 2b connected to a discharge port 11 of the bladder 1, to communicate with each other through a circulation valve 20. A pump 21 serving as a gas feeder is provided in the gas circulating flow path 2.

Here, the pump 21 may be provided in the return flow path 2b as in the embodiment, or alternatively, may be provided in the forward flow path 2a.

A gas supply flow path 3 having a gas supply valve 30 is connected to the forward flow path 2a, and a gas discharge flow path 4 having a gas discharge valve 40 is connected to the return flow path 2b.

An air-water separation section 5 is provided on the way through the return flow path 2b in the gas circulating flow path 2; the return flow path 2b is connected to an upper space 5a of the air-water separation section 5, and the gas discharge flow path 4 is connected to a lower space 5b of the air-water separation section 5.

Furthermore, in this embodiment, an auxiliary air-water separation section 6 is provided on the way through the forward flow path 2a in the gas circulating flow path 2; the forward flow path 2a is connected to an upper space 6a of the auxiliary air-water separation section 6; and the gas supply flow path 3 is connected to a lower space 6b of the air-water separation section 6.

Making allowance for a possible amount of drain, the capacity of each of the air-water separation section 5 and auxiliary air-water separation section 6 is set so that each of the lower spaces 5b and 6b is formed as a drain chamber, and each of the upper chambers 5a and 6a is formed as a gas distribution chamber.

When the gas supply valve 30 and gas discharge valve 40 are opened with a raw tire being set inside the mold, and the heating gas is supplied from the gas supply flow path 3 with the circulation valve 20 being closed, the heating gas flows inside the bladder 1. With the bladder 1 being filled with the heating gas, the gas supply valve 30 and gas discharge valve 40 are closed.

After the bladder 1 has been filled with the heating gas, the gas circulating flow path 2 is open by releasing the circulation valve 20, and thereby a closed circulating circuit is formed between the gas circulating flow path 2 and the inside of bladder 1.

In this state, the pump 21 is operated to circulate the heating gas between the gas circulating flow path 2 and the inside of the bladder 1. The circulation of the heating gas allows the temperature difference inside the bladder 1 to be eliminated.

At this time, the heating gas, which is circulating, is partly liquefied to thereby become a drain due to a heat exchange within the bladder 1, and this drain undesirably flows in the gas circulating flow path 2.

Under this situation, when the heating gas including the drain is discharged from the return flow path 2b and flows into the air-water separation section 5, the drain is stored in the lower space 5b serving as a drain chamber, of the air-water separation section 5.

Since the return flow path 2b is connected to the upper space 5a of the air-water separation section 5, the heating gas, which has separated the drain in the air-water separation section 5 as described above, passes through the gas distribution chamber just as it is, and continues circulating in the gas circulating flow path 2.

Here, the drain generated by the heat exchange within the bladder 1 can possibly flow back in the forward flow path 2a from the supply port 10. However, in this embodiment, the drain that has flowed back can be stored in the lower space 6b serving as the drain chamber, of the auxiliary air-water separation section 6.

While circulating the heating gas as described above, the raw tire is subjected to vulcanization molding.

After having completed this vulcanization molding, in a state where the circulation valve 20 and gas discharge valve 40 are opened and the gas supply valve 30 is closed, the pump 21 is operated. Thereby, the heating gas filling the inside of the bladder 1 and the gas circulating flow path 2 can be discharged from the gas discharge flow path 4, and simultaneously the drain stored in the air-water separation section 5 can be discharged from the gas discharge flow path 4.

Next, in a state where the circulation valve 20 and gas supply valve 30 are opened and the gas discharge valve 40 is closed, the pump 21 is operated. Thereby, the drain stored in the auxiliary air-water separation section 6 can be discharged from the gas supply flow path 3.

In the present invention, the gas circulating flow path 2 may be provided with a heating unit.

As this heating unit, a steam jacket or electrothermal heater is used. Heating the heating gas in the gas circulating flow path 2 by the heating unit allows the prevention of the temperature drop and pressure drop of the heating gas. The installation position of the heating unit may be any place as long as the place is located on the way through the gas circulating flow path 2.

INDUSTRIAL APPLICABILITY

As described above, since the gas cycle apparatus (claim 1) for a tire vulcanizer, according to the present invention has an air-water separation section provided on the way through the return flow path in the gas circulating flow path, the drain can be stored in this air-water separation section.

Therefore, since the drain does not flow in the gas circulating flow path, the gas feeder of the gas cycle apparatus can be prevented from being subjected to an excessive load by the drain. Therefore, energy conventionally consumed for circulating the drain can be used exclusively for circulating the heating gas, thereby allowing the circulation amount of heating gas to be increased.

This makes it possible to improve the temperature difference eliminating capacity, shorten the tire vulcanizing time, and enhance the production capacity of tires.

Also, since the gas cycle apparatus (claim 2) for a tire vulcanizer, according to the present invention has an auxiliary air-water separation section provided on the way through the forward flow path in the gas circulating flow path, the drain that has been flowed back from the supply port of the bladder can be stored by this auxiliary air-water separation section.

Thus, by the use of the air-water separation section and auxiliary air-water separation section, the defect of the drain flowing in the gas circulating flow path can be substantially perfectly eliminated.

The invention claimed is:

1. A gas cycle apparatus for a tire vulcanizer, the apparatus comprising:
   a bladder expanding and contracting under the supply/discharge of a heating gas;
   a gas circulating flow path constituted by allowing a forward flow path connected to a supply port of the bladder and a return flow path connected to a discharge port of the bladder, to communicate with each other through a circulation valve;

a gas feeder provided in the gas circulating flow path;

a gas supply flow path connected to the forward flow path, and a gas discharge flow path connected to the return flow path; and a gas supply valve provided in the gas supply flow path, and a gas discharge valve provided in the gas discharge flow path, wherein an air-water separation section is provided on the way through the return flow path in the gas circulating flow path;

wherein the return flow path is connected to an upper space of the air-water separation section, and the gas discharge flow path is connected to a lower space of the air-water separation section; and wherein, after vulcanization molding has been completed, in a state where the circulation valve and the gas discharge valve are opened and the gas supply valve is closed, the gas feeder is operated, and thereby heating gas filling the inside of the bladder and the gas circulating flow path is discharged from the gas discharge flow path, while discharging drain stored in the air-water separation section from the gas discharge flow path.

2. The gas cycle apparatus according to claim 1, wherein an auxiliary air-water separation section is provided on the way through the forward flow path in the gas circulating flow path; and wherein the forward flow path is connected to an upper space of the auxiliary air-water separation section, and the gas supply flow path is connected to a lower space of the auxiliary air-water separation section.

* * * * *